Nov. 2, 1965    P. MOLLARD    3,215,493
PROCESS OF AGGLOMERATING FINE CRYSTALS AND CRYOLITE PRODUCT
Filed Sept. 4, 1963    2 Sheets-Sheet 2

INVENTOR.
Paul Mollard
BY
HIS ATTORNEYS

United States Patent Office 3,215,493
Patented Nov. 2, 1965

3,215,493
PROCESS OF AGGLOMERATING FINE CRYSTALS
AND CRYOLITE PRODUCT
Paul Mollard, Pierre-Benite, France, assignor to Societe d'Electro-Chimie d'Electro-Metallurgie et des Acieries Electriques d'Ugine, Paris, France, a corporation of France
Filed Sept. 4, 1963, Ser. No. 316,197
18 Claims. (Cl. 23—88)

This invention relates to a process of agglomerating fine crystals of mineral and organic substances and to products resulting therefrom. The process permits one to obtain directly, without any further sifting, crystalline agglomerates with definite sizes, desired apparent density and other desired properties. Many of these agglomerates disintegrate and dissolve rapidly when in contact with a solvent.

This application is a continuation-in-part in my application Serial No. 777,516, filed December 1, 1958, and is a continuation-in-part of my application Serial No. 55,532, filed September 12, 1960, now abandoned.

According to known practice, the solutions containing the substances to be crystallized are brought to the desired saturation point and are then left resting in static crystallizing dishes or are introduced into devices equipped with a stirring means. The solutions are cooled to cause crystals to form. According to this method, crystals having very different grain sizes for the same substances are obtained, depending upon the state of saturation of the solution, the rate of cooling, the rate of stirring, and the rate at which the liquid is drawn off from the crystals. The operator endeavors to control the various factors governing crystallization in order to produce crystals with the desired grain size, depending upon their particular use. However, it is not always possible to obtain the desired grain size and most often it is necessary to sift the crystals to produce those of desired size.

A well defined grain size, an adequate apparent density and for some substances a high dissolution rate constitute, among others, important properties whether the crystalline substance is to be mixed with other substances or used by itself. As an example, sodium perborate, made electrolytically or chemically, constitutes a large portion of the composition of many commercial detergents. The sodium perborate must have a grain size very nearly the same as the grain size of the detergents with which it is mixed and must have a proper apparent density so as to prevent segregation of the perborate and the detergents at the time of filling the containers, handling and transporting the packed products. The presence of very light fine crystals in the preparation or use of the product is likely to pollute the atmosphere and to inconvenience users of the product. Where the detergent mixture is used to treat linen, a high dissolution speed is necessary in order to prevent solid particles of sodium perborate contacting the linen at the time of employment.

Different methods have been considered or used with a view to bringing the crystallized substances to the physical state required by the user but the most usual of these methods, sifting, has well known drawbacks. It requires separation and elimination of the too fine and the too coarse crystals which can represent a high percentage of the original substance and often constitutes materials which are not readily salable. Accordingly, sometimes the particles which are too fine or too coarse are reintroduced into the circuit by dissolving them again, but this increases the cost of production. Other objections are that the particles which are too large must be pulverized and sifted again.

When the crystallization conditions and the nature of the crystalline substances provide only fine crystals, the problem is to obtain bigger unit crystals or agglomerates of these in order to obtain the resuired physical properties, i.e., well defined grain size, adequate apparent density and high dissolution speed.

Different methods have been proposed to solve this problem. Thus, in the case of sodium perborate, it has been suggested to submit the fine crystals, extracted from their mother liquors by centrifugation, to a rotating movement in mixers provided with paddles. There is thus obtained an agglomeration of the crystals which may be promoted by the injection into the apparatus of a certain quantity of water supplied with a binder. But the agglomerated material must again undergo a sifting which may or may not be preceded by a crushing.

It has also been endeavored to obtain the bonding by submitting a pulp of crystals, with a well defined water content, to the mechanical operations of various contour-forming devices such as pressing, molding and slubbing, followed by crushing and often by a sifting.

Finally, it has been attempted to agglomerate sodium perborate crystals by inducing their partial fusion in the crystallizing water. However, this operation always has to be followed by a clod-breaking and a sifting.

The various methods heretofore used do not satisfactorily solve the problem. They require sifting and are accompanied by various expenses which increase the cost. Some of them lead to active oxygen loss and others to pollution of the atmosphere.

These disadvantages are overcome according to the present invention. It provides a general method for the continuous formation of agglomerates with definite and selected sizes, from fine crystals of organic and mineral substances, which process comprises bonding unit crystals of these substances by arranging them in the form of a fluid bed in a supersaturated solution of the same substance maintained in continuous movement. The supersaturated state of the solution is maintained by a regular and continuous addition of the substance while the crystals to be agglomerated are maintained in such a state of suspension that they come in contact or come near adequately to cause them to be agglomerated.

According to the invention, a supersaturated solution of the same substance as the crystals to be agglomerated is caused to flow upwardly through a column. Fine crystals of the substance to be agglomerated are introduced into the column and a fluid bed suspension of the fine crystals is maintained in the column by the upwardly flowing supersaturated solution to cause the bonding of said fine crystals by a bonding material of the same substance supplied by the said supersaturated solution and form the agglomerates.

The process as applied, for example, to agglomerating fine crystals of sodium perborate involves the following steps. A supersaturated solution of sodium perborate is caused to flow upwardly through a column. Fine crystals of sodium perborate are introduced into the column and a fluid bed suspension of the fine crystals is maintained in the upwardly flowing supersaturated solution to cause the bonding of said fine crystals by sodium perborate supplied by the said supersaturated solution and form agglomerates from the fine crystals of sodium perborate. The agglomerates of sodium perborate are allowed to settle and are removed from the column. The desupersaturated sodium perborate solution is continuously removed from the column; it is regenerated by adding sodium metaborate and hydrogen peroxide to it in quantities sufficient to bring the solution to supersaturated state and the built-up again supersaturated sodium perborate solution is again continuously introduced into the column and caused to flow upwardly in order to suspend and treat a further quantity of fine sodium perborate crystals.

According to the invention, the bonding of the fine crystals is accomplished by supplying the same substance as the fine crystals themselves, from a supersaturated solution of the crystals. There is drawn off from the apparatus in which the agglomeration takes place, a weight of agglomerated crystals exceeding that of the fine crystals to be agglomerated which are introduced into the apparatus. The agglomeration is thus accompanied by an effective increase of crystallized substance, which confers to the present method a notable advantage and originality over other known methods.

For carrying out the process, it is possible to use any known device which permits maintaining a suspension of the fine crystals to be agglomerated in a supersaturated solution of the same materials as the crystals themselves. The fine crystals to be agglomerated may come from a cooler or a centrifuge. They are preferably admitted at the top of the device while the agglomerates, which are continuously forming, are drawn off from the lower part of the device at the desired level.

The device is filled with the supersaturated solution which is to provide the bonding material for the fine crystals to be agglomerated. The supersaturated solution flows continually through the device from bottom to top at a proper speed. It is constantly regenerated in order to maintain the supersaturation at the desired degree by regular and continuous additions of the required substances. Preferably, there is introduced into the device the reagents which, when reacted, produce the substance itself.

The rate of rise of the supersaturated solution in the device is adjusted so as to maintain the fluid bed suspension of the fine crystals to be agglomerated in the supersaturated solution in the device. On the other hand, the rate of rise of the supersaturated solution in the device must not be so great that bonding and agglomeration of the fine crystals are not possible. The stirring of the suspension, which, if desired, can be modified by means other than the rate of climb of the supersaturated solution in the device, must be such that the bonding of the crystals always is possible and that the formed agglomerates not be broken.

The degree of supersaturation of the supersaturated solution must be adjusted in order to avoid the formation from said solution of crystal nuclei which would superpose and join themselves to the specially introduced fine crystals to be agglomerated. It is desirable, however, to work very close to that limit because, other things being equal, the bonding speed of the crystals and, therefore, the formation speed of the agglomerates increase with the degree of supersaturation. On the other hand, if the degree of supersaturation is below a certain level, there would be a slow and constant increase in the size of the unit crystals but no agglomerates would be produced.

The addition of reagents required for regenerating constantly the supersaturated solution which becomes desupersaturated by supplying material for bonding the fine crystals to be agglomerated is of special importance. The quantity of the substance thus produced in comparison with the quantity of fine crystals introduced into the device during the same time directly affects the size of the agglomerates. An increase of this ratio favors increase in the sizes of the agglomerates and makes them stronger; whereas the apparent density and dissolution speed of the agglomerates decrease. This ratio varies according to the form and particularly to the size of the unit crystals introduced into the device. Other things being equal, this ratio can be reduced when the sizes of the introduced unit crystals increase, and vice versa, and one can still obtain the desired size agglomerates.

The size of the agglomerates is closely related to the size of the crystals introduced into the agglomerating device, i.e., initial large crystals produce large agglomerates.

The use of cryolite has increased greatly in the course of the last fifty years due especially to the increase in aluminum produced. As is known, cryolite represents about 8% of the raw materials used for the production of aluminum.

Natural cryolite exists only in Greenland and it has been attempted for a long time to produce a synthetic cryolite having a composition approximately that of natural cryolite. Up to now, however, the synthetic products had a composition containing more $AlF_3$ than the natural cryolite $2AlF_3 \cdot 6NaF$ and which in some cases contains a certain percentage of chiolite $3AlF_3 \cdot 5NaF$.

Furthermore, the synthetic cryolite obtained by the most common methods is in the form of a very fine grain of about one micron, i.e., in the form of an impalpable dust.

Nevertheless, cryolite crystals having a size range of a few microns can be obtained by means of a systematic slow crystallization. But such crystals are accompanied by many more crystals of about one micron. A suspension of such product is of the gelatinous type having known disadvantages. Said crystals whether of a size range of about one micron, or a few microns, decant (settle) very slowly, are very hard to filter, wash and dry. The obtained dry product is in the form of a powder which has a tendency to produce friable pellets and the product does not flow easily.

Cryolite agglomerates obtained according to the present process are in the form of rounded, small masses similar in appearance to raspberries or blackberries, which can be readily separated from their mother-waters by filtration and readily dried. The size of these agglomerates can be adjusted over a large range. The flow characteristics of the dry agglomerates are excellent and this is particularly useful in supplying the agglomerates to aluminum electrolysis vats.

Synthetic cryolite agglomerates, according to the present invention, constitute a new product having characteristics different from and superior to prior known cryolite. They have the following characteristics:

(1) CRYSTAL FORM

Whereas the unit grains of the known synthetic cryolite are in the form of small plates, the new cryolite in accordance with the invention is in the form of rounded agglomerates like raspberries or blackberries, without any friable peaks or sharp protuberances. The unit grains of the agglomerates are rounded and the agglomerate is substantially free from sharp protuberances.

(2) SIZE

The cryolite agglomerates of the invention, although obtained from unit grains generally of a size less than three microns, have sizes from about 60 to 450 microns, but as a rule about 300 microns. These sizes, obviously, depend on the time of their stay in the formation apparatus. The size of the agglomerates can be controlled, by means of this staying time, in accordance with the intended use of the agglomerates and the required productivity.

(3) DENSITY

It may be concluded, from the examination of X-ray diagrams, that cryolite agglomerates according to the invention have the same absolute density as natural cryolite, i.e., from 2.95 to 3.

Its picometer density (filling the open pores with a liquid) is about 2.76 to 2.97.

Its apparent density (bulk density) measured on a considerable quantity of agglomerate grains, is about 0.90 to 1.29. Such a density varies, of course, according to the compaction of the agglomerates. It is, however, much higher than the density of prior known synthetic cryolite agglomerates, which is about 0.4 to 0.6.

(4) DECANTATION

The decantation or sedimentation speed of the cryolite agglomerates obtained according to the present invention, determined by the appearance of a volume of clear liquid in a test tube containing an aqueous suspension of 400 gr./l. of agglomerates is about 3 to 10 meters per hour in function of the average size of grain whereas the decantation speed of known synthetic cryolite is only about 0.1 meter per hour.

(5) FILTERING

A suspension of cryolite agglomerates according to the invention can be readily filter pressed to remove the mother-waters which impregnate the agglomerates; whereas it is difficult to filter press a suspension of synthetic cryolite of the kind known in the prior art in which the cryolite is of a size of about one micron, because it is so fine that a large proportion of the suspension is lost with the mother-waters in filter pressing.

Thus the filter-cake obtained by filter pressing a suspension of prior known synthetic cryolite particles contains about 38 to 50% mother-waters, whereas the filter-cake according to the present invention contains only about 4 to 10% of the mother-waters.

(6) WASHING

The cryolite agglomerates according to the invention can be washed very easily. The wash water, which wets the surfaces of the agglomerates very well, clears them very easily from the mother-waters which they still contain.

(7) DRYING

The cryolite agglomerates according to the invention are easy to dry because after filter pressing and washing, they contain only a very small quantity of water.

Whereas the known impalpable powders of the prior known, usual cryolite require the use of slow voluminous driers and the employment of elevated temperatures, thus resulting in an objectionable contact with air and a poor yield, the cryolite agglomerates according to the invention can be dried in a simple ambient air stream or by a stirring with hot gases. It is possible also to use the cyclone drying process. The necessary temperature is not very high and the yield is excellent.

(8) FLOW CHARACTERISTICS

Figures 6, 7:
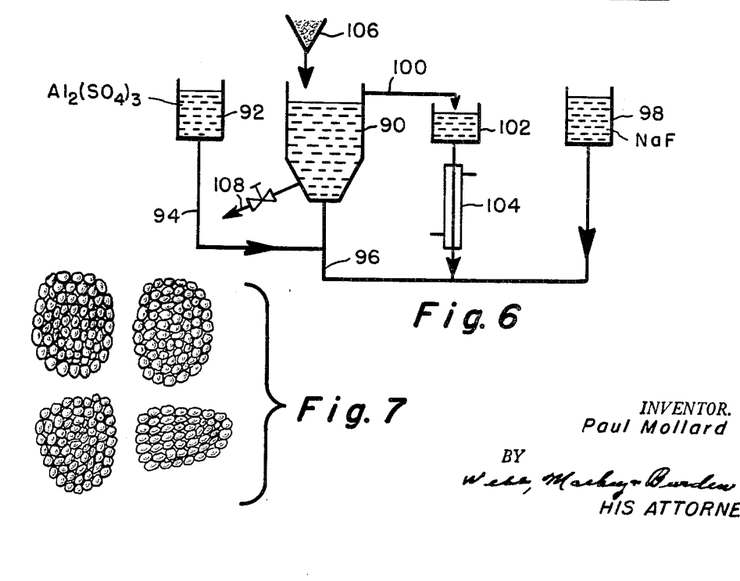
FIGURE 7 shows, on an enlarged scale, synthetic cryolite agglomerates according to the invention.

The dry cryolite agglomerates according to the invention flow very readily due particularly to the spheroidal or rounded form of the unit grains and the absence of dust. FIGURE 7 illustrates cryolite agglomerates according to the invention. The ready-flowing characteristics of the dry agglomerates are particularly desirable in supplying the agglomerates to electrolysis vats. As an example, the flow characteristics of the agglomerates according to the invention have been measured with B.213–48 ASTM test. The cryolite agglomerates according to the invention having an average size of the grains between 100 and 120$\mu$ flew within 100 sec., whereas synthetic cryolites from various origins did not pass through.

(9) GRAIN SIZE

The cryolite agglomerates according to the invention can be produced in a large range of grain sizes while remaining homogeneous. Thus, for instance, by varying certain factors such as rate of rise of the supersaturated liquid, degree of supersaturation of said liquid, amount of agitation of the fluid bed, the amounts and ratios of the reagents added and grain size of the fine crystals which are introduced, one can obtain, for instance, the four following types of granulation:

| $\leq 38\mu$ | $\leq 74\mu$ | $\geq 149\mu$ | $\geq 297\mu$ | Average size of the grains in $\mu$ |
| --- | --- | --- | --- | --- |
| Percent | Percent | Percent | Percent | |
| 0 | 2.5 | 3 | 0 | 102 |
| 0 | 0.5 | 6.5 | 0 | 120 |
| 0 | 0.4 | 93 | 2.5 | 230 |
| 2.5 | 40 | 0 | 0 | 80 |

(10) CHEMICAL COMPOSITION

The usual known synthetic cryolite shows the spectrum of natural cryolite, but also lines corresponding to known products such as sodium sulphate, sodium fluoride, alumina, as well as non-identified lines.

The chemical composition of the cryolite agglomerates according to the invention is essentially the same as the chemical composition of natural cryolite $2AlF_3.6NaF$. Their X-ray diagrams are effectively identical.

Nevertheless, by modifying the pH of the cryolite formation reaction according to the different variants of the process, for example by regulating the ratios of the reagents used, it is possible to vary the composition of the obtained cryolite agglomerates, the composition of which can range from about $2AlF_3.5.5NaF$ to $2Al_3.6.87NaF$.

For example, if the reagents used are sodium aluminate and hydrofluoric acid, the pH may vary from 2 to 8; if the reagents are sodium fluoride and aluminum sulphate, the pH may vary from 4 to 6; if the reagents are ammonium fluoride and sodium aluminate, the pH may vary from 9.5 to 10.5.

(11) IRON

In the usual synthetic cryolite prepared, for instance, by reacting sodium aluminate and hydrofluoric acid, the iron coming from the reagents precipitates in the form of iron hydroxide, then is converted into iron oxide or various complexes. This iron is introduced with the cryolite into the aluminum electrolysis baths and consequently contaminates the aluminum obtained from the baths.

The new cryolite agglomerate according to the present invention, on the contrary, is iron-free. In the process of the present invention, it is possible to control the pH of the reaction medium by controlling the ratios of the reagents present so that the iron passes into solution and is eliminated continuously.

In the accompanying drawings.

The following examples illustrate the method of agglomerating sodium perborate, chloral hydrate, ammonium alum and cryolite crystals. These examples are not limitative since the invention is applicable to the agglomeration of all organic and mineral crystals.

*Example 1.—Agglomeration of sodium perborate crystals*

Figure 1:
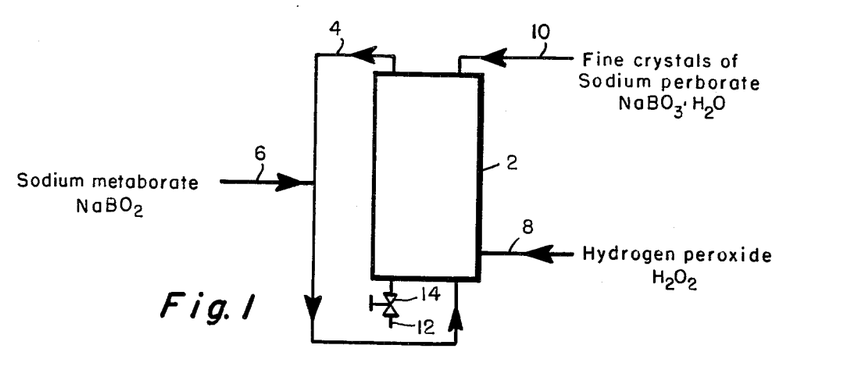
FIGURES 1–6 illustrate in a diagrammatic manner devices which can be used in carrying out the present invention.

The method may be carried out in the apparatus shown in FIGURE 1. Reference numeral 2 designates a column having a diameter of 0.62 m. and a height of 1.6 m. Desupersaturated sodium perborate solution passing out of the column 2 through pipe 4 had sodium metaborate added to it through pipe 6. The sodium metaborate solution introduced through pipe 6 contained 200 g./l. of $NaBO_2$. The mixture of sodium perborate solution and sodium metaborate solution was introduced into the bottom of the column 2. A hydrogen peroxide aqueous solution containing 27% by weight of $H_2O_2$ was introduced into the column adjacent its bottom through a pipe 8. The sodium metaborate and the hydrogen peroxide reacted to produce a supersaturated solution of sodium perborate. This supersaturated sodium perborate solution, at a temperature of 20° C., was passed upwardly through the column 2 at the rate of 3 m.³ per hour. Certain quantities of fine crystals of sodium perborate were added to the top of the column through a pipe 10 and the fine crystals so added were maintained in fluid bed suspension by controlling the rate of rise of the supersaturated solution of sodium perborate in the column.

At normal working, the column was supplied continuously with sodium perborate fine crystals and the agglomerates were drawn off from the bottom of the column 2 through a pipe 12 provided with a valve 14. For a supply of fine sodium perborate crystals of 60 kgs. per hour, there were obtained 100 kgs. per hour of agglomerates.

The following table shows the results obtained by varying the ratio B/A, in which B is the weight of the perborate produced in the column 2 by the mixture $$NaBO_2 — H_2O_2$$

and A is the weight of the fine crystals introduced during the same lapse of time.

| A, percent | B, percent | Granulation of A, Cumulated Oversizes | | | Granulation of the Final Product A+B Cumulated Oversizes | | | Apparent Density of A+B g./l. |
|---|---|---|---|---|---|---|---|---|
| | | >300µ | >150µ | >74µ | >300µ | >150µ | >74µ | |
| | | Percent | Percent | Percent | Percent | Percent | Percent | |
| 75 | 25 | 4.5 | 13.5 | 70 | 7 | 60 | 95.5 | 625 |
| 67 | 33 | 4.5 | 19 | 72 | 9.5 | 63 | 93 | 600 |
| 60 | 40 | 6 | 25 | 70 | 24 | 86 | 97.5 | 600 |
| 50 | 50 | 7 | 17 | 64 | 25 | 86 | 98.2 | 590 |
| 40 | 60 | 7 | 31 | 76 | 40 | 95 | 99.4 | 570 |

*Example 2.—Agglomeration of sodium perborate crystals*

In Example 1, the perborate fine crystals were obtained from an outside operation quite separate and independent from the agglomerating column 2.

In this Example 2, fine crystals of sodium perborate were obtained by crushing a certain quantity of the agglomerates produced in the column 2.

By utilizing, under the same conditions as given in Example 1, a weight A equal to about 12% of fine crystals with the following granulation:

| | Percent |
|---|---|
| >300µ | 5 |
| >150µ | 60 |
| >74µ | 80 | and a weight B of 88%, there was obtained a final product having the following characteristics:

| | | |
|---|---|---|
| >300µ | percent | 96 |
| >150µ | do | 99.7 |
| >74µ | do | 100 |
| Apparent density | g./dm.³ | 580 |

*Example 3.—Agglomeration of fine crystals of chloral hydrate, $CCl_3CH(OH)_2$*

Figure 2:
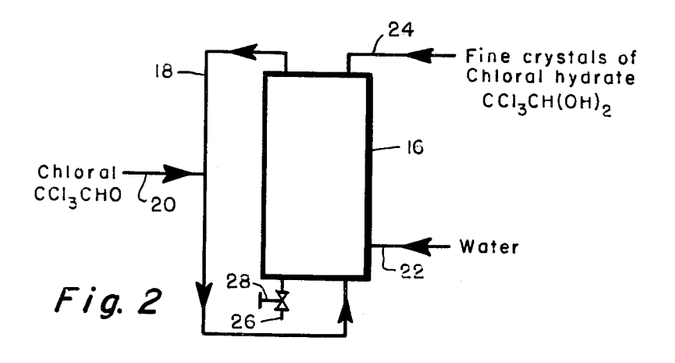

The method may be carried out in the apparatus shown in FIGURE 2.

The frustrum column 16 had a height of 2.5 m., a diameter at its upper end of 0.4 m., and a diameter at its lower end of 0.3 m. The desupersaturated chloral hydrate solution flowed from the top of the column 16 through a pipe 18. Supersaturation of the chloral hydrate solution was maintained by adding chloral ($CCl_3CHO$) to the desupersaturated solution through a pipe 20. The quantity of water necessary to form chloral hydrate from the chloral was introduced into the column 16 adjacent its bottom through a pipe 22. The supersaturated aqueous chloral hydrate solution formed in the bottom of the column was continuously circulated upwardly through the column at the rate of 500 liters per hour and at a temperature slightly above 18° C. The crystallization temperature was maintained at 18° C. Fine crystals of chloral hydrate of grain size from 50 to 300 microns each were continuously introduced into the top of the column through a pipe 24 at the rate of 1 kg. per hour. The fine crystals introduced through the pipe 24 were maintained in fluid bed suspension by the ascending liquid flowing through the column.

In the normal working, 6 kgs. per hour of chloral hydrate agglomerates were drawn off from the column through the pipe 26 provided with valve 28 as pellets or discs of about 2 mm. diameter.

*Example 4.—Agglomeration of fine crystals of ammonium alum*

Figure 3:
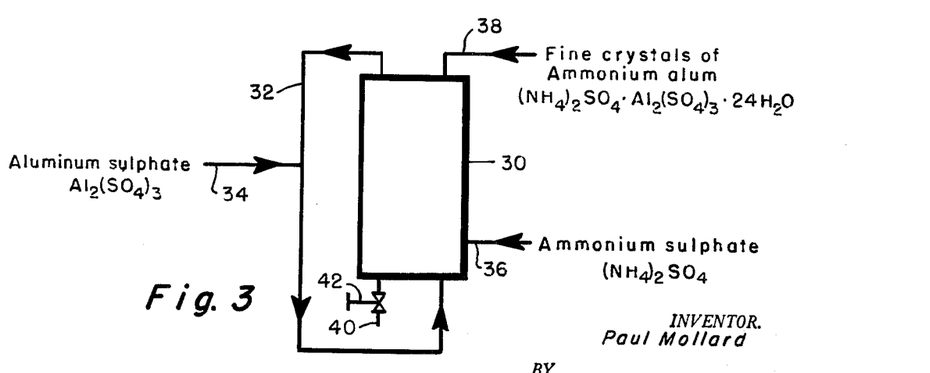

The method may be carried out in the apparatus shown in FIGURE 3.

The column 30 was 2 m. in height and 0.25 m. in diameter. A desupersaturated solution of ammonium alum circulated from the top of the column through a pipe 32. Aluminum sulphate, $Al_2(SO_4)_3$, was added to it by means of a pipe 34 and the mixed solution was returned to the bottom of the column 30. Ammonium sulphate, $$(NH_4)_2SO_4$$

was introduced into the column adjacent its bottom through a pipe 36, the aluminum sulphate and ammonium sulphate reacting to produce ammonium alum which was continuously circulated upwardly through the column. The aluminum sulphate was introduced through the pipe 34 in the form of an unsaturated aqueous solution containing from 24 to 26% by weight of $Al_2(SO_4)_3$. The amount of ammonium sulphate introduced through the pipe 36 corresponded in quantity to the amount of aluminum sulphate added through the pipe 34. The ammonium sulphate introduced through the pipe 36 was in the form of a saturated aqueous solution at 20° C. The supersaturated ammonium alum solution formed in the bottom of the column was circulated at the rate of 2 m.³ per hour and was at a temperature of 17° C., said supersaturated solution introducing into the column 17.5 kgs. per hour of ammonium alum.

Fine crystals of ammonium alum of grain sizes between 1 and 100 microns were introduced into the top of the column through pipe 38 at the rate of 2.5 kgs. per hour and were maintained in fluid bed suspension by the upwardly flowing solution in the column. The agglomerates of ammonium alum were drawn off through a pipe 40 connected to the bottom of the column, the pipe being provided with a valve 42. The ammonium sulphate and aluminum sulphate resulted in the formation in the column of ammonium alum which bonded and agglomerated the fine crystals of ammonium alum introduced through the pipe 38.

In normal working, 20 kgs. per hour of ammonium alum were drawn off from the column as agglomerates having an average diameter of 500 microns.

*Example 5.—Agglomeration of fine crystals of ammonium alum*

In this example, which is a variant of Example 4, fine crystals of ammonium alum of 200 to 350 microns diameter were introduced into the column 30 through pipe 38. This increase of size in relation to the size of crystals in Example 4 requires the introduction of a greater weight of crystals in order to keep the same surface. 16 kgs. per hour of 200–350µ crystals were introduced instead of 2.5 kgs. per hour 1–100µ crystals. In order to limit the size of the agglomerates to the desired value of 500µ, it was necessary to regulate the addition of the reagents (aluminum sulphate and ammonium sulphate) so as to introduce into the column 14 kgs. per hour of ammonium alum.

In the normal working, 30 kgs. per hour of ammonium alum were drawn off from the column as agglomerates of 500 microns average diameter.

*Example 6.—Agglomeration of fine crystals of cryolite*

Figure 4:
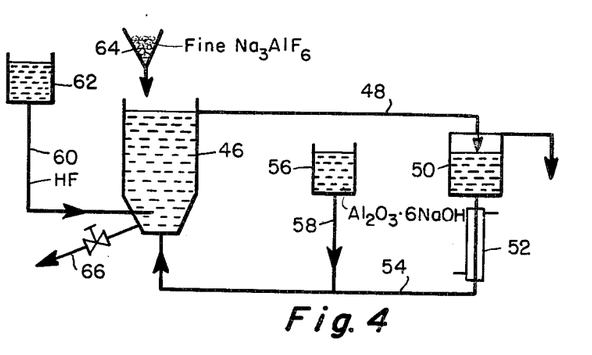

The method may be carried out in the apparatus shown in FIGURE 4. Reference numeral 46 designates a column having a diameter of 1.5 m. and a height of 3.5 m. Desupersaturated cryolite solution, but saturated with cryolite, passing out of the column 46 through pipe 48 was delivered to a container 50 and from there flowed through a cooler 52 and pipe 54 which returned it to the bottom of the column 46. A solution of sodium aluminate was delivered from container 56 through pipe 58 to the pipe 54 which returned it to the bottom of the column 46. The sodium aluminate solution in container 56 contained 342 g./l. of $Al_2O_3.6NaOH$ and was fed at the rate of 0.25 m.$^3$ per hour. An aqueous solution of hydrofluoric acid containing 40 g./l. of HF was supplied to the column 46 through pipe 60 from a container 62, the rate of feed of the hydrofluoric acid solution being such as to correspond to the sodium aluminate fed to the column 46 through pipe 54. The sodium aluminate and hydrofluoric acid solutions reacted to produce a supersaturated solution of cryolite according to the reaction:

$$Al_2O_3.6NaOH + 12HF = 2Na_3AlF_6 + 9H_2O$$

The supersaturated solution of cryolite flowed upwardly through the column 46 at the rate of 5 m.$^3$ per hour. The cooler 52 enabled the supersaturated solution of cryolite in the column 46 to be maintained at about 30° C.

Fine crystals of cryolite of dimensions between 5 and 20 microns were continuously introduced into the top of the column 46 from a hopper 64 at the rate of 6 kgs. per hour. These crystals were maintained in fluid suspension due to the upward flow of the liquid and were agglomerated.

Under continuous working conditions, 100 kgs. of cryolite agglomerates, of sizes ranging between 150 and 300 microns, were drawn off per hour from the column 46 through the pipe 66.

The concentration of the hydrofluoric acid solution could vary within rather large limits. It has been proved that this concentration could be as low as 2 g./l. of acid.

*Example 7.—Agglomeration of cryolite crystals*

Figure 5:
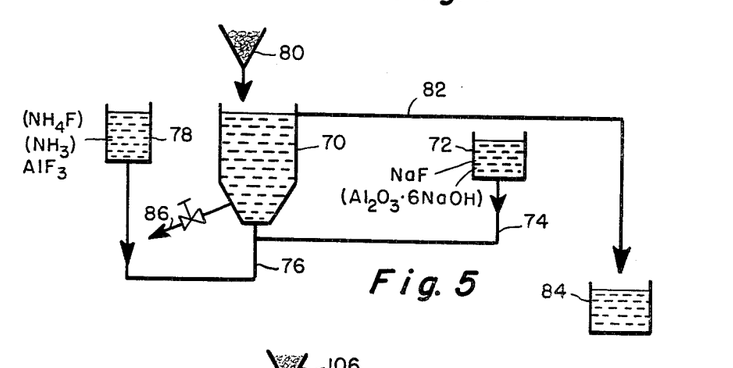

The method may be carried out in the apparatus shown in FIGURE 5.

The column 70 had the same dimensions at the column 46. A solution of sodium fluoride contained in container 72 and obtained by a recovery of gaseous hydrofluoric acid by alkaline washing, the sodium fluoride solution in container 72 containing 35 g./l. of NaF, was fed from the container 72 through pipe 74 to a pipe 76 which led to the bottom of the column 70. An aluminum fluoride solution containing 4.2 g./l. of $AlF_3$, obtained by dissolving $AlF_3.3H_2O$ in water, was fed to the bottom of the column 70 through pipe 76 from container 78. The aluminum fluoride solution was fed at a rate of 5 m.$^3$ per hour and the sodium fluoride solution at the rate of 0.9 m.$^3$ per hour, these materials reacting in the column 70 to form cryolite according to the reaction:

$$3NaF + AlF_3 = Na_3AlF_6$$

The supersaturated solution of cryolite flowed upwardly through the column 70 and there were continuously introduced into the top of the column from a hopper 80 fine crystals of cryolite having dimensions between 5 and 25 microns, these fine crystals being fed at the rate of 4 kgs. per hour. The fine crystals of cryolite were maintained in fluid suspension in the column 70 by the upwardly flowing liquid. The solution flowing out of the top of the column 70 through pipe 82, although saturated in cryolite at the temperature of the liquid in the column, was substantially free from NaF and $AlF_3$. The solution flowing through pipe 82, although saturated in cryolite, was desupersaturated as compared with the supersaturated solution of cryolite introduced into the bottom of the column. The solution flowing through pipe 82 was delivered to a container 84. It could be reused partially in order to produce an NaF or $AlF_3$ solution for reuse in the process.

52 kgs. per hour of cryolite in the form of agglomerates of 200 to 300 microns were withdrawn from the column 70 through pipe 86.

*Example 8.—Agglomeration of fine crystals of cryolite*

The method may be carried out in the apparatus shown in FIGURE 6 in which the column 90 had the same dimensions as the column 46.

The solution of aluminum sulphate contained in container 92 was fed through pipe 94 to a pipe 96 which led to the bottom of the column 90. The aluminum sulphate solution fed through pipe 94 contained 342 g./l. and was fed at the rate of 0.25 m.$^3$ per hour.

A sodium fluoride solution contained in container 98 and having a concentration of 35 g./l. of NaF was fed from the container 98 by pipe 96 into the bottom of the column 90 at the rate of 3.5 m.$^3$ per hour.

A saturated solution of cryolite flowed from the top of the column 90 through pipe 100, container 102, cooler 104 and pipe 96, and was returned to the bottom of the column 90. The cooler 104 cooled this solution to a temperature of 25° C.

The sodium fluoride introduced into the bottom of the column through pipe 96 and the aluminum sulphate introduced into the bottom of the column through pipe 94 reacted in the column according to the following equation to form a supersaturated solution of cryolite:

$$12NaF + 3Al_2(SO_4)_3 = 2Na_3AlF_6 + 3Na_2SO_4$$

Fine crystals of cryolite having sizes between 5 and 30 microns were fed into the top of the column from a hopper 106 at the rate of 10 kgs. per hour and were maintained in fluid suspension by the upward flow of the liquid. The liquid in the column was maintained at a temperature of 30° C. by the cooler 104.

100 kgs. per hour of cryolite agglomerates of sizes between 200 and 300 microns were withdrawn from the column through the pipe 108.

*Example 9.—Agglomeration of fine crystals of cryolite*

The method may be carried out in the apparatus shown in FIGURE 5.

In this example, cryolite agglomerates were prepared by reacting ammonium fluoride and sodium aluminate according to the equation:

$$12NH_4F + Al_2O_3.6NaOH + 3H_2O = 2Na_3AlF_6 + 12NH_4OH$$

An ammonium fluoride solution containing 37 g./l. of $NH_4F$ and 2.5 g./l. of $NH_3$ was fed at the rate of 10 m.$^3$ per hour from the container 78 through the pipe 76 into the bottom of the column 70. A solution of sodium aluminate containing 342 g./l. of $Al_2O_3.6NaOH$ was fed at the rate of 0.80 m.$^3$ per hour from container 72 through pipe 74 to the pipe 76 which delivered it to the bottom of the column 70. Thus, the solution supplied to the bottom of the column 70 was supersaturated with cryolite.

Fine crystals of cryolite of dimensions between 5 and 20 microns were fed at the rate of 20 kgs. per hour into the top of the column from the hopper 80, these fine crystals being maintained in suspension due to the upward flow of the liquid in the column. Under established working conditions, 350 kgs. per hour of agglomerated cryolite of dimensions between 150 and 300 microns were withdrawn per hour through the pipe 86.

The invention is not limited to the preferred embodiment but may be otherwise embodied or practiced within the scope of the following claims.

I claim:

1. A continuous process of agglomerating fine crystals which comprises flowing upwardly through a column a supersaturated solution of the same substance as said crystals to be agglomerated, separately from said upward flowing introducing regularly and continuously into the column a material consisting essentially of fine crystals of the substance to be agglomerated, forming and maintaining a fluid bed suspension of said fine crystals by said upwardly flowing supersaturated solution, the rate of rise and stirring of said supersaturated solution being controlled so as to maintain said suspension of said fine crystals in said supersaturated solution in said column, being less than that which prevents bonding and agglomeration of said fine crystals and being less than that which carries a substantial part of said introduced fine crystals out through the top of said column, the bonding material being supplied by said supersaturated solution which becomes desupersaturated, allowing said agglomerates to settle, removing said agglomerates from the column and separately removing the desupersaturated solution from the column, regenerating it to bring it to the supersaturated state and returning it to the column, the degree of supersaturation of said supersaturated solution and of said regenerated supersaturated solution being adjusted to avoid formation from said supersaturated solutions of crystal nuclei which superpose and join themselves to said fine crystals of the substance to be agglomerated and being above that level at which occurs a slow and constant increase in the size of said fine crystals without production of agglomerates.

2. A process according to claim 1, in which the regeneration of the supersaturated solution is obtained by introducing the substance into the column.

3. A process according to claim 1, in which the regeneration of the supersaturated solution is obtained by introducing into the calumn the reagents which when reacted produce the substance.

4. A continuous process of agglomerating fine crystals of sodium perborate, which comprises flowing a supersaturated solution of sodium perborate upwardly through a column, separately from said upward flowing introducing a material consisting essentially of fine crystals of sodium perborate into the column, forming and maintaining a fluid bed suspension of said introduced fine crystals in said upwardly flowing supersaturated solutions to cause the bonding of said fine crystals by sodium perborate supplied by said supersaturated solution and form agglomerates from said fine crystals of sodium perborate, the rate of rise and stirring of said supersaturated solution being controlled so as to maintain said suspension of said fine crystals in said supersaturated solution in said column, being less than that which prevents bonding and agglomeration of said fine crystals and being less than that which carries a substantial part of said introduced fine crystals out through the top of said column, said formation of agglomerates causing said supersaturated solution to become desupersaturated, allowing said agglomerates to settle, removing said agglomerates from said column, regenerating it to bring it to the supersaturated state and returning it to the column, the degree of supersaturation of said supersaturated solution and said regenerated supersaturated solution being adjusted to avoid formation from said supersaturated solutions of crystal nuclei which superpose and join themselves to said fine crystals to be agglomerated and being above that level at which occurs a slow and constant increase in the size of said fine crystals without production of agglomerates.

5. A continuous process of agglomerating fine crystals of chloral hydrate, which comprises flowing a supersaturated solution of chloral hydrate upwardly through a column, separately from said upward flowing introducing a material consisting essentially of fine crystals of chloral hydrate into the column, forming and maintaining a fluid bed suspension of said introduced fine crystals in said upwardly flowing supersaturated solution to cause the bonding of said fine crystals by chloral hydrate supplied by said supersaturated solution and form agglomerates from said fine crystals of chloral hydrate, the rate of rise and stirring of said supersaturated solution being controlled so as to maintain said suspension of said fine crystals in said supersaturated solution in said column, being less than that which prevents bonding and agglomeration of said fine crystals and being less than that which carries a substantial part of said introduced fine crystals out through the top of said column, said formation of agglomerates causing said supersaturated solution to become desupersaturated, allowing said agglomerates to settle, removing said agglomerates from said column and separately removing the desupersaturated solution from the column, regenerating it to bring it to the supersaturated state and returning it to the column, the degree of supersaturation of said supersaturated solution and said regenerated supersaturated solution being adjusted to avoid formation from said supersaturated solutions of crystal nuclei which superpose and join themselves to said fine crystals to be agglomerated and being above that level at which occurs a slow and constant increase in the size of said fine crystals without production of agglomerates.

6. A continuous process of agglomerating fine crystals of ammonium alum, which comprises flowing a supersaturated solution of ammonium alum upwardly through a column, separately from said upward flowing introducing a material consisting essentially of fine crystals of ammonium alum into the column, forming and maintaining a fluid bed suspension of said introduced fine crystals in said upwardly flowing supersaturated solution to cause the bonding of said fine crystals by ammonium alum supplied by said supersaturated solution and form agglomerates from said fine crystals of ammonium alum, the rate of rise and stirring of said supersaturated solution being controlled so as to maintain said suspension of said fine crystals in said supersaturated solution in said column, being less than that which prevents bonding and agglomeration of said fine crystals and being less than that which carries a substantial part of said introduced fine crystals out through the top of said column, said formation of agglomerates causing said supersaturated solution to become desupersaturated, allowing said agglomerates to settle, removing said agglomerates from said column and separately removing the desupersaturated solution from the column, regenerating it to bring it to the supersaturated state and returning it to the column, the degree of supersaturation of said supersaturated solution and said regenerated supersaturated solution being adjusted to avoid formation from said supersaturated solutions of crystal nuclei which superpose and join themselves to said fine crystals to be agglomerated and being above that level at which occurs a slow and constant increase in the size of said fine crystals without production of agglomerates.

7. A continuous process of agglomerating fine crystals of sodium perborate, which comprises introducing into the bottom of a column a desupersaturated solution of sodium perborate and the reagents which when reacted produce sodium perborate, in amounts to form in the bottom of the column a supersaturated solution of sodium perborate, flowing said supersaturated solution upwardly through the column, separately from said upward flowing introducing a material consisting essentially of fine crystals of sodium perborate into the column, forming and maintaining a fluid bed suspension of said introduced fine crystals in said upwardly flowing supersaturated solution to cause the bonding of said fine crystals by sodium perborate supplied by said supersaturated solution and form agglomerates from said fine crystals of sodium perborate, the rate of rise and stirring of said supersaturated solution being controlled so as to maintain said suspension of said fine crystals in said supersaturated solution in said column, being less than that which prevents bonding and agglomeration of said fine crystals and being less than that which carries a substantial part of said introduced fine crystals out through the top of said column, said formation of agglomerates causing said supersaturated solution to become desupersaturated, allowing said agglomerates to settle, removing said agglomerates from said column and separately removing the desupersaturated solution from the column, introducing again into the bottom of the column said desupersaturated sodium perborate solution and the reagents which when reacted produce sodium perborate in amounts to form a regenerated supersaturated solution of sodium perborate, the degree of supersaturation of said supersaturated solution and said regenerated supersaturated solution being adjusted to avoid formation from said supersaturated solutions of crystal nuclei which superpose and join themselves to said fine crystals to be agglomerated and being above that level at which occurs a slow and constant increase in the size of said fine crystals without production of agglomerates, and flowing said regenerated supersaturated solution upwardly in the column to agglomerate a further quantity of fine crystals of sodium perborate.

8. A continuous process of agglomerating fine crystals of chloral hydrate, which comprises introducing into the bottom of a column a desupersaturated solution of chloral hydrate and the reagents which when reacted produce chloral hydrate, in amounts to form in the bottom of the column a supersaturated solution of chloral hydrate, flowing said supersaturated solution upwardly through the column, separately from said upward flowing introducing a material consisting essentially of fine crystals of chloral hydrate into the column, forming and maintaining a fluid bed suspension of said introduced fine crystals in said upwardly flowing supersaturated solution to cause the bonding of said fine crystals by chloral hydrate supplied by said supersaturated solution and form agglomerates from said fine crystals of chloral hydrate, the rate of rise and stirring of said supersaturated solution being controlled so as to maintain said suspension of said fine crystals in said supersaturated solution in said column, being less than that which prevents bonding and agglomeration of said fine crystals and being less than that which carries a substantial part of said introduced fine crystals out through the top of said column, said formation of agglomerates causing said supersaturated solution to become desupersaturated, allowing said agglomerates to settle, removing said agglomerates for said column and separately removing the chloral hydrate desupersaturated solution from the column, introducing again into the bottom of the column the chloral hydrate desupersaturated solution and the reagents which when reacted produce chloral hydrate in amounts to form a regenerated supersaturated solution of chloral hydrate, the degree of supersaturation of said supersaturated solution and said regenerated supersaturated solution being adjusted to avoid formation from said supersaturated solutions of crystal nuclei which superpose and join themselves to said fine crystals to be agglomerated and being above that level at which occurs a slow and constant increase in the size of said fine crystals without production of agglomerates, and flowing said regenerated supersaturated solution upwardly in the column to agglomerate a further quantity of fine crystals of chloral hydrate.

9. A continuous process of agglomerating fine crystals of ammonium alum, which comprises introducing into the bottom of a column a desupersaturated solution of ammonium alum and the reagents which when reacted produce ammonium alum, in amounts to form in the bottom of the column a supersaturated solution of ammonium alum, flowing said supersaturated solution upwardly through the column, separately from said upward flowing introducing a material consisting essentially of fine crystals of ammonium alum into the column, forming and maintaining a fluid bed suspension of said introduced fine crystals in said upwardly flowing supersaturated solution to cause the bonding of said crystals by ammonium alum supplied by said supersaturated solution and form agglomerates from said fine crystals of ammonium alum, the rate of rise and stirring of said supersaturated solution being controlled so as to maintain said suspension of said fine crystals in said supersaturated solution in said column, being less than that which prevents bonding and agglomeration of said fine crystals and being less than that which carries a substantial part of said introduced fine crystals out through the top of said column, said formation of agglomerates causing said supersaturated solution to become desupersaturated, allowing said agglomerates to settle, removing said agglomerates from said column and separately removing the desupersaturated ammonium alum solution from the column, introducing again into the bottom of the column the desupersaturated ammonium alum solution and the reagents which when reacted produce ammonium alum in amounts to form a regenerated supersaturated solution of ammonium alum, the degree of supersaturation of said supersaturated solution and said regenerated supersaturated solution being adjusted to avoid formation from said supersaturated solutions of crystal nuclei which superpose and join themselves to said fine crystals to be agglomerated and being above that level at which occurs a slow and constant increase in the size of said fine crystals without production of agglomerates, and flowing said regenerated supersaturated solution upwardly in the column to agglomerate a further quantity of fine crystals of ammonium alum.

10. A continuous process of agglomerating fine crystals of cryolite, which comprises flowing a supersaturated solution of cryolite upwardly through a column, separately from said upward flowing introducing a material consisting essentially of fine crystals of cryolite into the column, forming and maintaining a fluid bed suspension of said introduced fine crystals in said upwardly flowing supersaturated solution to cause the bonding of said fine crystals by cryolite supplied by said supersaturated solution and form agglomerates from said fine crystals of cryolite, the rate of rise and stirring of said supersaturated solution being controlled so as to maintain said suspension of said fine crystals in said supersaturated solution in said column, being less than that which prevents bonding and agglomeration of said fine crystals and being less than that which carries a substantial part of said introduced fine crystals out through the top of said column, said formation of agglomerates causing said supersaturated solution to become desupersaturated, allowing said agglomerates to settle, removing said agglomerates from said column and separately removing the desupersaturated cryolite solution from the column, regenerating it to bring it to the supersaturated state and returning it to the column, the degree of supersaturation of said supersaturated solution and said regenerated supersaturated solution being adjusted to avoid formation from said supersaturated solutions of crystal nuclei which superpose and join themselevs to said fine crystals to be agglomerated and being above that level at which occurs a slow and constant increase in the size of said fine crystals without production of agglomerates.

11. A continuous process of agglomerating fine crystals of cryolite, which comprises introducing into the bottom of a column a desupersaturated solution of cryolite and the reagents which when reacted produce cryolite, in amounts to form in the bottom of the column a supersaturated solution of cryolite, flowing said supersaturated solution upwardly through the column, separately from said upward flowing introducing a material consisting essentially of fine crystals of cryolite into the column, forming and maintaining a fluid bed suspension of said introduced fine crystals in said upwardly flowing supersaturated solution to cause the bonding of said fine crystals by cryolite supplied by said supersaturated solution and form agglomerates from said fine crystals of cryolite, the rate of rise and stirring of said supersaturated solution being controlled so as to maintain said suspension of said fine crystals in said supersaturated solution in said column, being less than that which prevents bonding and agglomeration of said fine crystals and being less than that which carries a substantial part of said introduced fine crystals out through the top of said column, said formation of agglomerates causing said supersaturated solution to become desupersaturated, allowing said agglomerates to settle, removing said agglomerates from said column and separately removing the desupersaturated cryolite solution from the column, introducing again into the bottom of the column said desupersaturated cryolite solution and the reagents which when reacted produce cryolite in amounts to form a regenerated supersaturated solution of cryolite, the degree of supersaturation of said supersaturated solution and said regenerated supersaturated solution being adjusted to avoid formation from said supersaturated solutions of crystal nuclei which superpose and join themselves to said fine crystals to be agglomerated and being above that level at which occurs a slow and constant increase in the size of said fine crystals without production of agglomerates, and flowing said regenerated supersaturated solution upwardly in the column to agglomerate a further quantity of fine crystals of cryolite.

12. A continuous process of agglomerating fine crystals of cryolite, which comprises introducing into the bottom of a column a desupersaturated solution of cryolite, a solution of sodium aluminate and a solution of hydrofluoric acid in amounts to form in the bottom of a column a supersaturated solution of cryolite, flowing said supersaturated solution upwardly through the column, separately from said upward flowing introducing a material consisting essentially of fine crystals of cryolite into the column, forming and maintaining a fluid bed suspension of said introduced fine crystals in said upwardly flowing supersaturated solution to cause the bonding of said fine crystals by cryolite supplied by said supersaturated solution and form agglomerates from said fine crystals of cryolite, the rate of rise and stirring of said supersaturated solution being controlled so as to maintain said suspension of said fine crystals in said supersaturated solution in said column, being less than that which prevents bonding and agglomeration of said fine crystals and being less than that which carries a substantial part of said introduced fine crystals out through the top of said column, said formation of agglomerates causing said supersaturated solution to become desupersaturated, allowing said agglomerates to settle, removing said agglomerates from said column and separately removing the desupersaturated solution from the column, introducing again into the bottom of the column said desupersaturated cryolite solution, a solution of sodium aluminate and a solution of hydrofluoric acid in amounts to form in the bottom of the column a regenerated supersaturated solution of cryolite, the degree of supersaturation of said supersaturated solution and said regenerated supersaturated solution being adjusted to avoid formation from said supersaturated solutions of crystal nuclei which superpose and join themselves to said fine crystals to be agglomerated and being above that level at which occurs a slow and constant increase in the size of said fine crystals without production of agglomerates, and flowing said regenerated supersaturated solution upwardly in the column to agglomerate a further quantity of fine crystals of cryolite.

13. A continuous process of agglomerating fine crystals of cryolite, which comprises introducing into the bottom of a column a solution of sodium fluoride and a solution of aluminum fluoride in amounts to form a supersaturated solution of cryolite, flowing said supersaturated solution upwardly through the column, separately from said upward flowing introducing a material consisting essentially of fine crystals of cryolite into the column, forming and maintaining a fluid bed suspension of said introduced fine crystals in said upwardly flowing supersaturated solution to cause the bonding of said fine crystals by cryolite supplied by said supersaturated solution and form agglomerates from said fine crystals of cryolite, the rate of rise and stirring of said supersaturated solution being controlled so as to maintain said suspension of said fine crystals in said supersaturated solution in said column, being less than that which prevents bonding and agglomeration of said fine crystals and being less than that which carries a substantial part of said introduced fine crystals out through the top of said column, allowing said agglomerates to settle, and removing said agglomerates from said column, the degree of supersaturation of said supersaturated solution being adjusted to avoid formation from said supersaturated solution of crystal nuclei which superposed and join themselves to said fine crystals to be agglomerated and being above that level at which occurs a slow and constant increase in the size of said fine crystals without production of agglomerates.

14. A continuous process of agglomerating fine crystals of cryolite, which comprises introducing into the bottom of a column a solution of sodium aluminate and a solution of ammonium fluoride in amounts to form a supersaturated solution of cryolite, flowing said supersautrated solution upwardly through the column, separately from said upward flowing introducing a material consisting essentially of fine crystals of cryolite into the column, forming and maintaining a fluid bed suspension of said introduced fine crystals in said upwardly flowing supersaturated solution to cause the bonding of said fine crystals by cryolite supplied by said supersaturated solution and form agglomerates from said fine crystals of cryolite, the rate of rise and stirring of said supersaturated solution being controlled so as to maintain said suspension of said fine crystals in said supersaturated solution in said column, being less than that which prevents bonding and agglomeration of said fine crystals and being less than that which carries a substantial part of said introduced fine crystals out through the top of said column, allowing said agglomerates to settle, and removing said agglomerates from said column, the degree of supersaturation of said supersaturated solution being adjusted to avoid formation from said supersaturated solution of crystal nuclei which superpose and join themselves to said fine crystals to be agglomerated and being above that level at which occurs a slow and constant increase in the size of said fine crystals without production of agglomerates.

15. A continuous process of agglomerating fine crystals of cryolite, which comprises introducing into the bottom of a column a desupersaturated solution of cryolite, a solution of sodium fluoride and a solution of aluminium sulphate in amounts to form in the bottom of the column a supersaturated solution of cryolite, flowing said supersaturated solution upwardly through the column, separately from said upward flowing introducing a material consisting essentially of fine crystals of cryolite into the column, forming and maintaining a fluid bed suspension of said introduced fine crystals in said upwardly flowing supersaturated solution to cause the bonding of said fine crystals by cryolite supplied by said supersaturated solution and form agglomerates from said fine crystals of cryolite, the rate of rise and stirring of said supersaturated solution being controlled so as to maintain said suspension of said fine crystals in said supersaturated solution in said column, being less than that which prevents bonding and agglomeration of said fine crystals and being less than that which carries a substantial part of said introduced fine crystals out through the top of said column, said formation of agglomerates causing said supersaturated solution to become desupersaturated, allowing said agglomerates to settle, removing said agglomerates from said column and separately removing the desupersaturated cryolite solution from the column, introducing again into the bottom of the column said desupersaturated cryolite solution, a solution of sodium fluoride and a solution of aluminum sulphate in amounts to form in the bottom of the column a regenerated supersaturated solution of cryolite, the degree of supersaturation of said supersaturated solution and said regenerated supersaturated solution being adjusted to avoid formation from said supersaturated solutions of crystal nuclei which superpose and join themselves to said fine crytal to be agglomerated and being above that level at which occurs a slow and constant increase in the size of said fine crystals without production of agglomerates, and flowing said regenerated supersaturated solution upwardly in the column to agglomerate a further quantity of fine crystals of cryolite.

16. A synthetic cryolite agglomerate comprising unit grains of cryolite bonded by cryolite, said grains being rounded, said agglomerate being substantially free from sharp protuberances, being a size between 60 and 450 microns, having an absolute density from 2.95 to 3, having a sedimentation speed of about 3 to 10 meters per hour and having a chemical composition between about $2AlF_3.5.5NaF$ and $2AlF_3.6.87\ NaF$.

17. The agglomerate of claim 16 characterized by said agglomerate having the appearance of a blackberry.

18. The agglomerate of claim 16 characterized by said agglomerate being a size about at least 300 microns.

References Cited by the Examiner
UNITED STATES PATENTS

| | | | |
|---|---|---|---|
| 1,873,251 | 8/32 | Allen et al. | 23—302 |
| 2,305,921 | 12/42 | Eringer | 23—88 |
| 2,492,650 | 12/49 | McClean et al. | 23—88 |
| 2,737,451 | 3/56 | Saemen | 23—302 |
| 2,943,914 | 7/60 | Moser | 23—88 |
| 2,963,344 | 12/60 | Tarbutton et al. | 23—88 |

MAURICE A. BRINDISI, *Primary Examiner.*

UNITED STATES PATENT OFFICE
CERTIFICATE OF CORRECTION

Patent No. 3,215,493                     November 2, 1965

Paul Mollard

It is hereby certified that error appears in the above numbered patent requiring correction and that the said Letters Patent should read as corrected below.

Column 1, line 19, for "in" read -- of --; column 9, line 46, for "at" read -- as --; column 11, line 33, for "calumn" read -- column --; line 42, for "solutions" read -- solution --; same column 11, line 56, after "column" insert -- and separately removing the desupersaturated solution from said column --; column 17, line 5, for "crytal" read -- crystals --.

Signed and sealed this 9th day of August 1966.

(SEAL)
Attest:

ERNEST W. SWIDER                      EDWARD J. BRENNER
Attesting Officer                          Commissioner of Patents